United States Patent [19]

Johnson

[11] 4,100,555

[45] Jul. 11, 1978

[54] MODULAR PHOTOGRAPHIC RANGEFINDER CAMERA

[75] Inventor: Bruce K. Johnson, Andover, Mass.

[73] Assignee: Polaroid Corporation, Cambridge, Mass.

[21] Appl. No.: 784,245

[22] Filed: Apr. 4, 1977

[51] Int. Cl.² ............... G03B 13/20; G03B 13/02; G01C 3/04

[52] U.S. Cl. ............................ 354/166; 354/219; 356/8

[58] Field of Search ............... 356/3, 8; 354/163, 166, 354/199, 219

[56] References Cited

U.S. PATENT DOCUMENTS

| 2,191,027 | 2/1940 | Ort | 354/219 |
|---|---|---|---|
| 2,970,511 | 2/1961 | Ruhle | 356/8 |
| 3,057,249 | 10/1962 | Miles | 354/219 |
| 3,529,527 | 9/1970 | Leitz | 354/166 |
| 3,543,665 | 12/1970 | Reed et al. | 354/166 |
| 3,782,259 | 1/1974 | Noble | 354/199 X |

FOREIGN PATENT DOCUMENTS

| 408,184 | 4/1934 | United Kingdom | 356/8 |
|---|---|---|---|
| 907,259 | 10/1962 | United Kingdom | 356/8 |

Primary Examiner—Donald A. Griffin
Attorney, Agent, or Firm—Edward S. Roman

[57] ABSTRACT

A combined view and rangefinder for use in cameras having a variable focus objective lens includes means for establishing a primary image of the scene to be photographed framed in a generally rectangular field of view together with a secondary focusing image superposed on the primary image and movable obliquely across the primary image in correspondence with camera focusing so that substantial coincidence between the primary and secondary images is indicative of the camera assuming a focused condition with respect to the scene to be photographed. In addition, the path of movement for the movable secondary image of the combined view and rangefinder is located above the geometric center of the primary image so as to facilitate the framing of a human photographic subject to locate the subject's head above the geometric center of the picture. The combined view and rangefinder may also be conveniently and easily assembled through snap-fitted components.

37 Claims, 7 Drawing Figures

MODULAR PHOTOGRAPHIC RANGEFINDER CAMERA

BACKGROUND OF THE INVENTION

1. Field of the Invention

This invention relates generally to a combined view and rangefinder for use in cameras having a variable focus objective lens and, more particularly, to a combined view and rangefinder comprising a plurality of snap-fit components and designed to provide a secondary focusing image superposed on a primary viewing image wherein the secondary focusing image may be moved across the primary viewing image in a special manner in correspondence with camera focusing.

2. Background of the Prior Art

Combined view and rangefinders for use in cameras having a variable focus objective lens are well known in the art. Such combined view and rangefinders generally provide a primary viewing image of the scene to be photographed framed in a field of view generally corresponding to the field of view of the camera objective lens as limited by a particular film format. A secondary focusing image having a field of view substantially smaller than the primary viewing image is provided in superposed relation with respect to the primary viewing image and may be moved thereacross in substantial correspondence with camera focusing. The camera is focused by imparting a translational movement to the objective lens along its optical axis while simultaneously effecting a corresponding movement of the secondary focusing image across the primary viewing image. The camera assumes a focused condition with respect to a particular scene to be photographed when the secondary focusing image is moved into direct coincidence with the primary viewing image.

Such combined view and rangefinders generally provide for movement of the secondary focusing image either vertically or horizontally across the field of view of the primary image thus making it difficult to focus on scenes having predominately vertical or horizontal lines. In addition, such combined view and rangefinders generally provide for the secondary focusing image to be centered for movement about the geometric center for the field of view of the primary viewing image thereby resulting in most photographers framing a human photographic subject about the geometric center of the camera field of view. Such framing of human photographic subjects, however, is esthetically undesirable. It is generally preferable to frame the head of a human photographic subject above the geometric center of the field of view. Since the field of view directly corresponds to the film format, this results in the head of a human photographic subject being in the upper half of the photograph which is esthetically preferable to the head of the human photographic subject being located in the exact center of the photograph. In addition, such combined range and viewfinders are generally critically toleranced resulting in a complicated and expensive assembly procedure.

Therefore, it is a primary object of this invention to provide a combined view and rangefinder for use in cameras having a variable focus objective lens wherein a secondary focusing image is provided for superposed oblique movement across a primary viewing image of the scene to be photographed to facilitate focusing under conditions wherein the scene to be photographed is composed primarily of vertical and/or horizontal lines.

It is a further object of this invention to provide a combined view and rangefinder for use in cameras having a variable focus objective lens wherein a secondary focusing image is provided for superposed movement along a path above the geometric center of a primary viewing image thereby facilitating the framing of human photographic subjects.

It is a further object of this invention to provide a combined view and rangefinder for use in cameras having a variable focus objective lens wherein the combined view and rangefinder comprises a plurality of non-critically toleranced components which may be easily and economically snap-fitted together to provide a combined view and rangefinder module which in turn may be calibrated apart from its associated camera and thereafter snap-fitted into the particular camera for which it is intended to be used.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A combined view and rangefinder is provided for use in cameras of the type having a variable focus objective lens. The combined view and rangefinder comprises a first lens element for receiving scene light from a scene to be photographed, an eye lens, a specularly reflective surface for receiving scene light independent of the first lens element, a second lens element for receiving scene light from the scene to be photographed by way of the specularly reflective surface, and means for splitting a light beam. Means are also provided for masking the first lens element so as to frame a first image of the scene to be photographed in a generally rectangular field of view generally corresponding to the field of view for the objective lens of the camera. Means are additionally provided for masking the second lens element so as to frame a second image of a portion of the scene to be photographed in the field of view. Means are provided for stationing the first lens element, the light beam splitting means, and the eye lens in spaced apart alignment so that the first lens element receives and transmits scene light from the scene to be photographed toward the beam splitting means which in turn transmits such scene light toward the eye lens to facilitate viewing of the first image. The support means additionally include means for supporting the second lens element for limited displacement about a determinate path and for supporting the specularly reflective surface in spaced apart optical alignment with respect to the second lens element on the opposite side of the second lens element from the beam splitting means. The specularly reflective surface operates to angularly deflect scene light to the second lens element whereby scene light received and transmitted by the second lens element is ultimately directed toward the beam splitting means so as to be deflected thereby toward the eye lens to accommodate viewing through the eye lens of the second image superposed on the first image. The scene light angularly deflected by the specularly reflective surface resides on a plane which obliquely intersects the rectangular field of view such that movement of the second lens element about its determinate path operates to move the second image obliquely across the rectangular field of view. Means are provided for facilitating movement of the second lens element across the determinate path in correspondence to camera focusing so that the second image is moved into substantial coincidence with the first image in correspondence to the objective lens of the camera assuming a focused condition with respect to the scene to be photographed.

The means for splitting a light beam may include a partially reflective planar surface which is arranged in specific non-parallel relationship with respect to the specularly reflective planar surface such that a beam of light coincident to a center line through the means for masking the second lens is reflected by the specularly reflective surface through the center of the second lens element when the second lens element is located at the center of its determinate path. This specific non-parallel relationship between the specularly reflective planar surface and the partially reflective planar surface operate to locate the second image off the geometric center of the field of view. The means for facilitating movement of the second lens element across its path in correspondence to camera focusing additionally operates so that the second image may be moved about a path above the geometric center of the field of view and thereby brought into substantial coincidence with the first image at a location above the geometric center of the field of view when the objective lens of the camera is in a focused condition with respect to the scene to be photographed.

The means of support preferably comprise a unitary stamped metal frame member having a first section extending longitudinally from the first lens element to the eye lens. The frame member additionally includes folded portions extending outward from the first section for engagingly supporting the first lens element, the beam splitting means and the eye lens. The frame member additionally includes a second section extending laterally outward from the first section which second section includes a longitudinal slot which defines the determinate path of displacement for the second lens element and additionally includes at least one folded portion for supporting the specularly reflective surface.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in the different figures to denote the same parts and wherein:

FIG. 2A is an enlarged perspective of a portion of FIG. 2;

DESCRIPTION OF THE PREFERRED EMBODIMENTS

Figure 1:
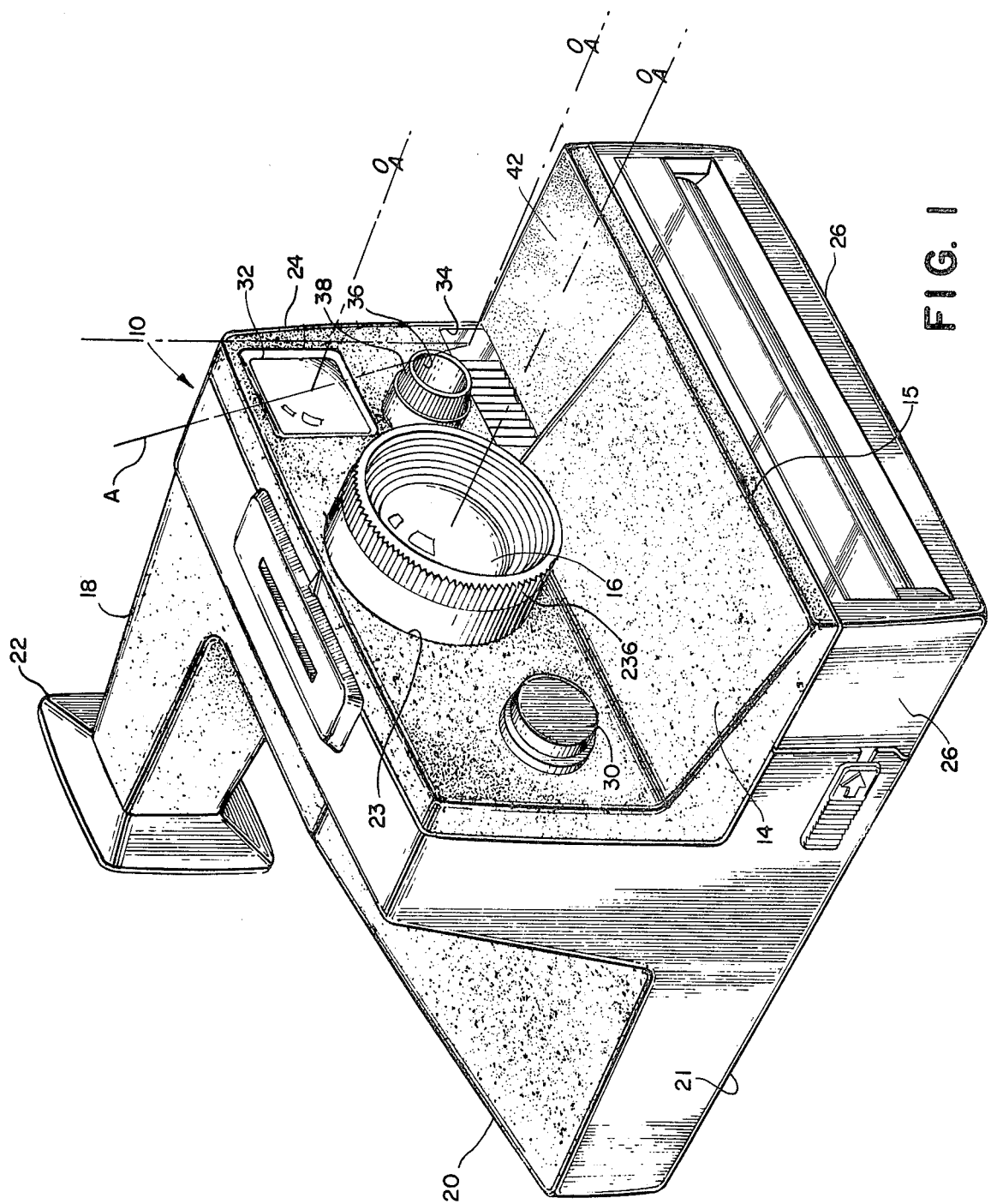
FIG. 1 is a perspective view of the camera which embarks the combined range and viewfinder ofthis invention.

Referring to FIG. 1 there is shown a non-folding camera 10 of the rangefinder type comprising a plurality of modular components having complementary configured snap-fit type assembly features as is more fully disclosed in copending U.S. patent application Ser. No. 554,769 entitled "Modular Photographic System Assembly Core With Snap-Fitted Subassemblies" by B. Johnson filed Mar. 3, 1975, and Ser. No. 554,770 entitled "Modular Photographic System" by D. Henry and S. Ivester, filed Mar. 3, 1975. The camera is provided with means for combining the viewing and rangefinding functions by means of a combination view and rangefinder as shown generally at 12 in FIGS. 2 – 5. The camera 10 comprises a housing 20 having a horizontal base portion 21 which is normally held by a user in a horizontal plane when implementing a photographic exposure cycle. The camera housing 20 additionally includes a front wall portion 24 having a first aperture 23 for accommodating the admission of scene light through a variable focus objective lens 16. A second aperture window 32 is spaced apart from the first aperture 23 and a third aperture or window 34 is provided in spaced apart relation with respect to the first and second apertures 23 and 32. The third aperture 34 is additionally spaced along the line A which intersects the second aperture and is oblique to the horizontal plane when the camera is held in its aforementioned normal picture taking position. The second and third apertures 32 and 34 function as windows for admitting scene light to the combined view and rangefinder 12. A portion of the combined view and rangefinder 12 is disposed in a rearwardly extending elongated tunnel portion 18 of the housing 20. At the rearward end of the tunnel portion 18, there is provided an eye cup 22 constructed of a suitably soft material such as rubber or the like against which a camera user may place his eye to view the scene to be photographed as imaged by the combined view and rangefinder 12 in a manner to be more fully discussed in the following discussion. The front wall portion 24 also includes an actuation button 30 through which a user may initiate a photographic exposure cycle in a manner as is more fully described in U.S. patent application Ser. No. 648,725 entitled "Shutter Latch Arrangement Releasable Through Shutter Blade Actuation and Resettable Through Film Advancement" by B. Johnson and G. Whiteside filed Jan. 13, 1976. The front wall portion 24 additionally includes a photometer aperture 36 therethrough to accommodate the admission of scene light to a photometer assembly (not shown). Surrounding the aperture 36 and extending forwardly therefrom, there is provided an annular adjusting knob 38 for controlling the response of the photometer assembly in correspondence with other exposure controlling apparatus (also not shown) in a manner as is more fully discussed in U.S. Pat. Nos. 3,972,057 entitled "Exposure Control System With Follow Focus Capability" by George Whiteside issued July 27, 1976, 3,972,058 entitled "Follow Focus Intercept Actuating System for Photographic Apparatus" by B. Johnson and G. Whiteside issued July 27, 1976, and 4,007,468 entitled "Trim Control Apparatus for Photographic Exposure Control System" by I. Blinow issued Feb. 8, 1977.

The front wall portion 24 also includes an integral apron 14 extending laterally forward of and downward from the objective lens 16 to a forward edge 15 which is parallel to the horizontal plane when a camera is held in its normal horizontal picture taking position. The apron 14 includes a recessed portion as shown generally at 42 to accommodate the admission of scene light to the third aperture 34. The camera 10 additionally includes a loading door 26 which may be pivotally rotated downwardly to provide access to the housing 20 to accommodate the loading and withdrawal of a film cassette from the interior of the camera 10 in a well known manner. As will be readily appreciated, film cassettes are of the self-processable type marketed by Polaroid Corporation for use in their SX-70 and Pronto type cameras.

Figure 2:
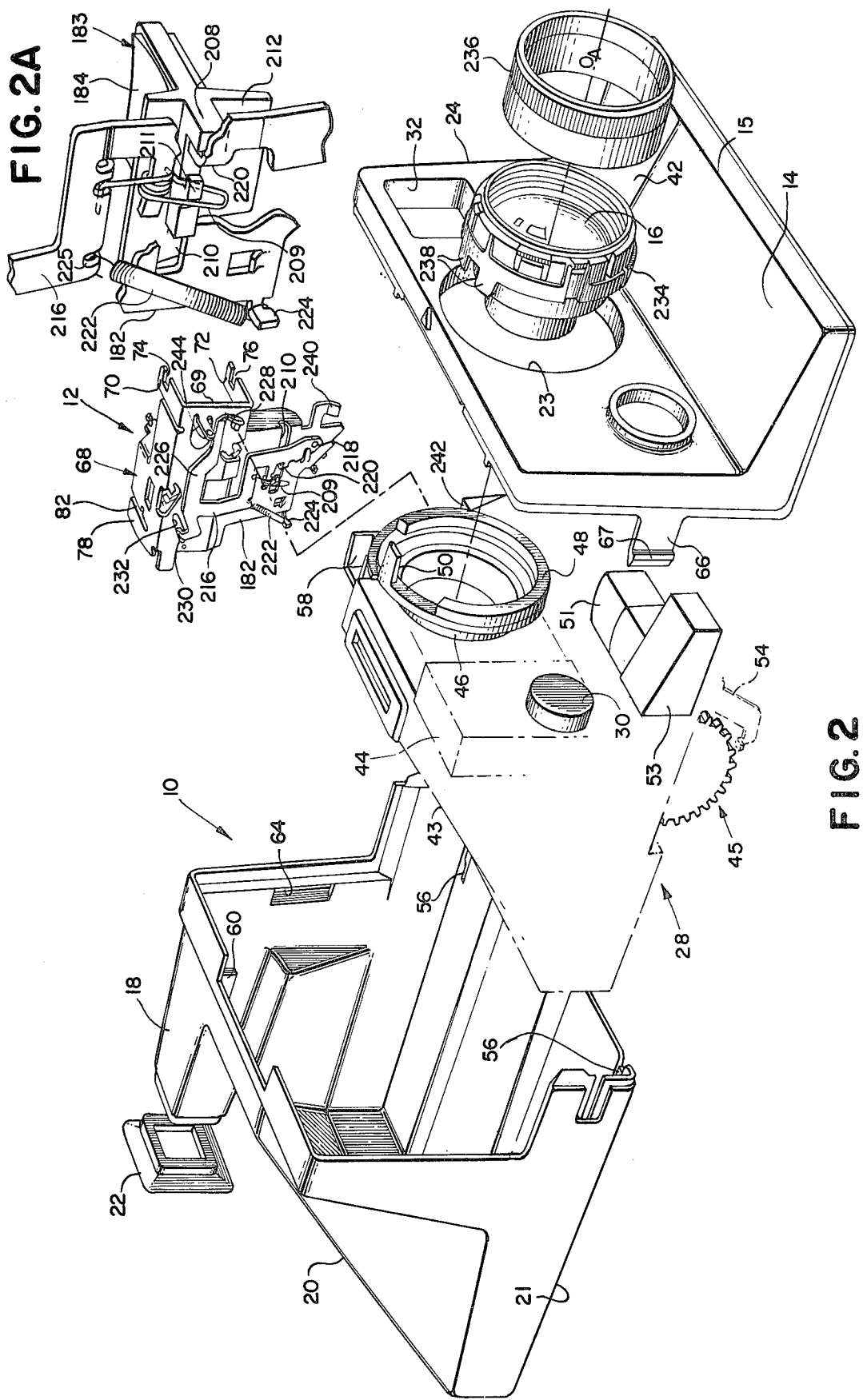
FIG. 2 is an exploded perspective of the camera of FIG. 1 including the combined range and viewfinder of this invention.

Referring now to FIG. 2, the camera 10 may be seen to comprise an inner camera assembly 28 including a cone 43 to which a plurality of modular components may be snap-fitted in the manner more fully described in U.S. patent application Ser. Nos. 554,769 and 554,770, supra. An exposure control module 44 can be snap-fitted to the forward side of the cone 43. The exposure control module 44 may include a pair of shutter blade elements (not shown) of the scanning type which operate in a manner as is more fully disclosed in U.S. Pat. No. 3,942,182 entitled "Camera With Pivoting Blades" by G. Whiteside issued Mar. 2, 1976. The exposure control module 44 includes an annular ring 46 extending forwardly and concentric with the optical axis of the objective lens 16. An annular face cam 48 is rotatably mounted with respect to the annular ring 46 for concentric rotation about the optical axis of the objective lens 16. The exposure control module 44 is configured so as not to overlap the second aperture 32 thereby accommodating mounting of the view and rangefinder 12 in alignment with the aperture 32 in the front wall portion 24 and the elongated tunnel portion 18 of the camera housing 20.

Projecting downwardly from the underside of the cone 43 there may be seen a portion of a gear member of a gear train module 45 which comprises a plurality of gear members rotatably driven by way of a motor 51. The motor 51 is controlled from the actuator button 30 by way of a switch control apparatus 53 in a manner as is more fully disclosed in copending Application Ser. No. 648,725, supra. The gear train module 45 in turn rotatably drives a pair of film processing rollers (not shown) for advancing exposed film units from the camera 10 while simultaneously spreading a developing fluid in a known manner.

A pair of spaced apart parallel legs 54 (only one of which is shown) extend downwardly from the inner camera assembly 28 for respective sliding engagement into a pair of spaced apart complementary configured slots 56 located in the horizontal base portion 21 of the camera housing 20. The top of the exposure control module 44 is provided with a horizontal open ended channel or groove 58 which slidingly engages a complementary projection (not shown) from the front wall portion 24. The closed end of the channel 58 is structured to abuttingly engage a vertical projection 60 in the camera housing 20 when the inner camera assembly 28 is inserted into the camera housing 20. Thus, the closed end of the channel 58 becomes sandwiched between the projection 60 on the housing 20 and the projection (not shown) on the front wall portion 24 upon assembly so as to locate the inner camera assembly 28 in an appropriate position between the housing 20 and the front wall portion 24. In addition, as is readily apparent, the vertical leg 54 and the slots 56 are structured to limit the extent that the camera assembly 28 can be slid into the housing 20. In addition, it becomes immediately apparent that upon assembly in the aforementioned manner, the motor 51 and its associated switch control apparatus 53 become stationed immediately adjacent the underside of the apron 14 aside the recessed area 42. The front wall portion 24 may be snap-fitted to the housing 20 by way of a pair of spaced apart flexible projections 66 (only one of which is shown) which extend outwardly and rearwardly from the front wall portion 24 and include respectively detents 67 on the outside edges thereof for complementary engagement with respective recesses 64 in the sides of housing 20. As is now readily apparent, the housing 20 defines a cavity which is structured to complement the exterior shape of the inner camera assembly 28. Snap-fitting the front wall portion 24 to the housing 20 operates to retain the inner camera assembly 28 in position within the housing 20.

Figure 3:
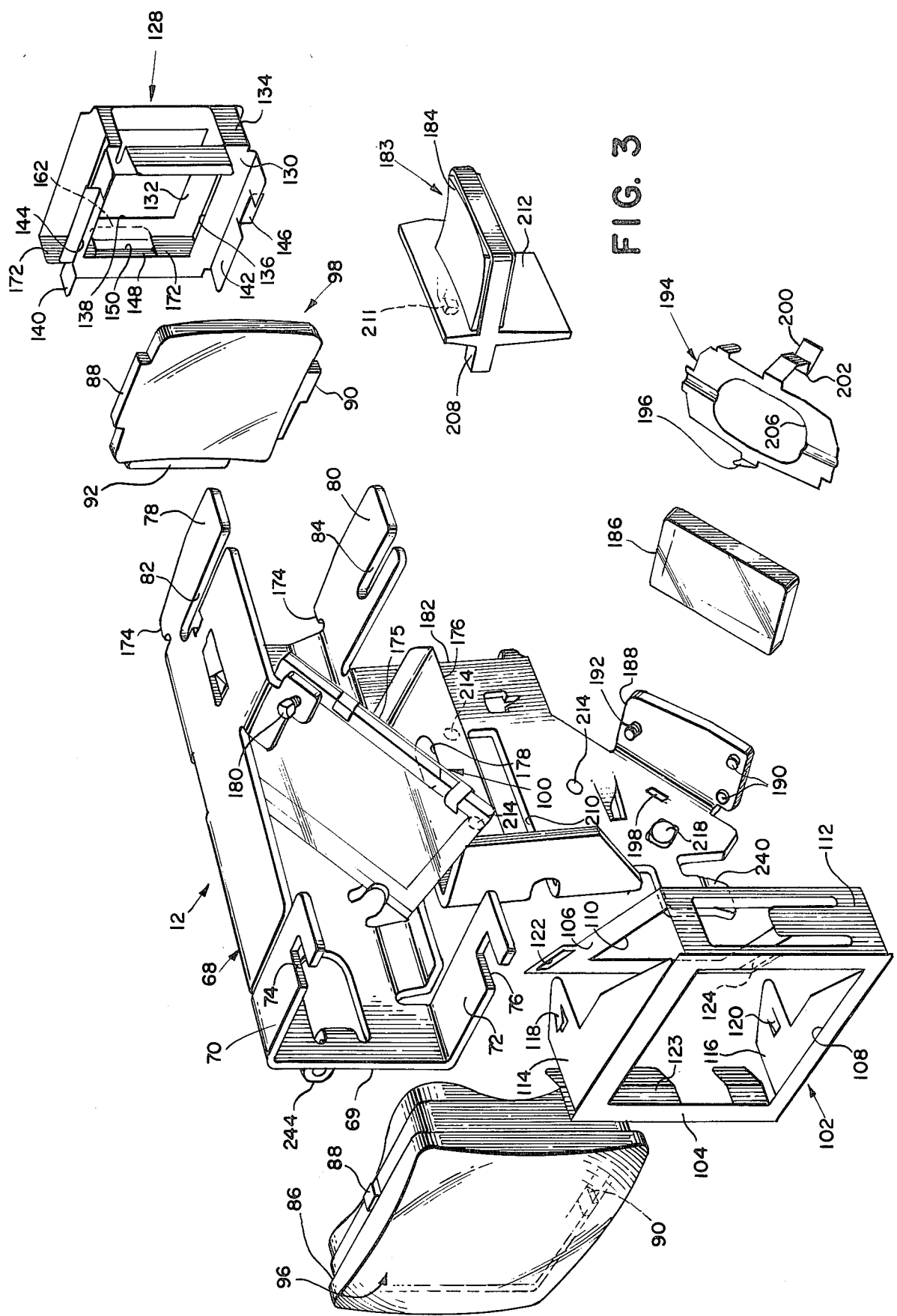
FIG. 3 is an enlarged exploded perspective of the combined range and viewfinder of FIG. 2.
Figure 4:
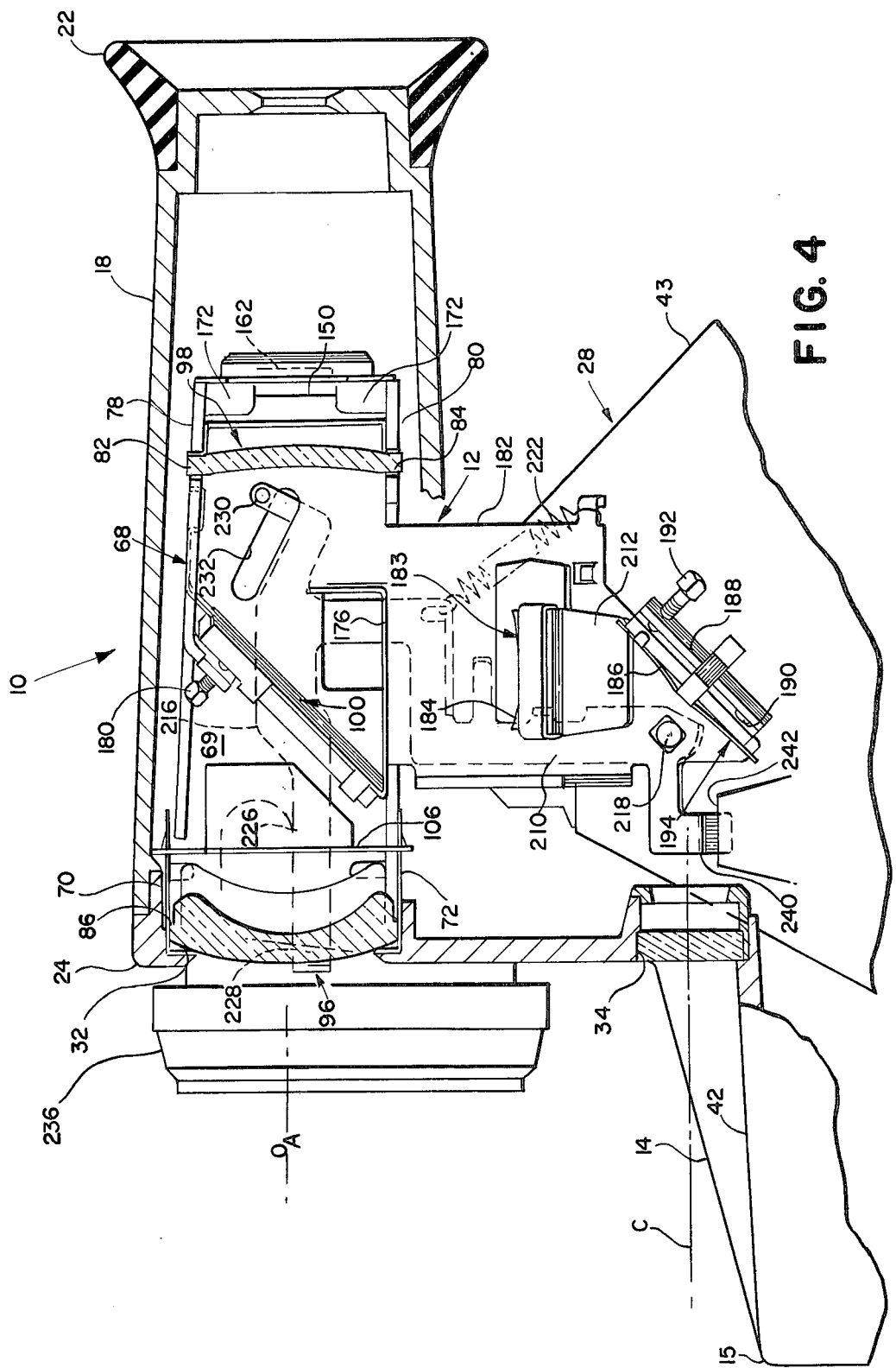
FIG. 4 is a side view, partly in cross section, of a portion of the camera of FIG. 1.

Referring now to both FIGS. 2 and 3 there can be seen the combined view and rangefinder 12 which comprises an objective lens element 96 for receiving scene light through the second aperture 32 from a scene to be photographed and imaging the scene light so received in a field of view generally corresponding to the field of view for the objective lens 16 of the camera. Means for splitting a light beam are provided by a dichroic partially reflective mirror 100 which transmits a portion of the scene light received from the objective lens 96. There is also provided an eye lens 98 to accommodate viewing of the imaged scene light from the objective lens 96 when a user aligns his eye with the eye cup 22 in the aforementioned manner. Means are provided by a unitary stamped metal frame member 68 for supporting the objective lens 96, the dichroic beam splitter 100 and the eye lens 98 in spaced apart alignment along an optical axis so that the objective lens 96 receives scene light through the aperture 32 and transmits such scene light from the scene to be photographed toward the dichroic beam splitter 100 which in turn transmits a portion of such scene light toward the eye lens 98 to facilitate viewing of the imaged scene light.

The frame member 68 includes a side wall section 69 extending longitudinally from the objective lens 96 to the eye lens 98. The frane member 68 additionally includes a first forward pair of spaced apart, opposed folded flange portions 70 and 72 extending laterally outward from the side wall section 69. The first pair of flange portions 70 and 72 include respectively open ended slots 74, 76 extending therein in directions generally parallel to the side wall section 69. A second pair of spaced apart parallel folded flange portions 78 and 80 extend laterally outward from the side wall section 69 in spaced apart relation from the first flange portions 70 and 72. The rearward flange portions 78 and 80 also include respectively open ended slots 82 and 84 extending therein in directions generally perpendicular to the side wall section 69.

The objective lens element 96 preferably is comprised of plastic, molded to provide a generally rectangular raised peripheral ridge 86 from which extend opposed projections 88, 90 for sliding engagement with respective slots 74, 76 in the forward pair of flange portions 70, 72. The raised peripheral ridge 86 abuttingly engages the leading edges of the side wall section 69 and the forward flange portions 70, 72 so as to determine proper alignment of the objective lens 96.

The eye lens 98 is also preferably of molded plastic construction having a pair of opposed projections 88, 90 disposed about the periphery thereof for sliding engagement with respective slots 82, 84 of respective rearward flange portions 78, 80. The eye lens 98 additionally includes a third integrally molded projection 92 extending laterally outward from the side thereof for engagement with the side wall section 69 upon insertion into slots 82, 84 thereby aligning the eye lens 98 along the optical axis of the objective lens 96.

Means are provided for masking the objective lens 96 so as to frame the scene light imaged by the objective lens 96 in a generally rectangular field of view corresponding to the field of view of the camera 10. The means for masking the objective lens 96 comprise a parallelepiped structure 102 having a forward major surface element 104 spaced apart in generally parallel relation to a rearward major surface element 106. The surface elements 104, 106 include respective rectangular apertures 108, 110 therethrough for framing the rectangular field of view and additionally presenting a light baffle to stray light which might otherwise enter the combined view and rangefinder 12. The parallelepiped structure 102 is preferably a thin sheet metal stamping and includes a side wall member 112 for maintaining the opposed major surface elements 104, 106 in spaced apart substantially parallel relation with respect to each other. Whereas the parallelepiped structure 102 is preferably a thin sheet metal stamping, the opposed major surface elements 104, 106 may be pivoted apart with respect to each other about the flexible edges of the side wall member 112 to accommodate insertion of the objective lens 96 therebetween. Means are provided for accommodating the snap-fitting of the opposed major surface elements 104, 106 into opposed spaced apart fixed relation with respect to each other. Such means include a first flange portion 114 folded downwardly from the top of the major surface element 104 together with a second flange portion 116 folded upwardly from the bottom of the major surface element 104. The top and bottom folded flange portions 114, 116 include respectively detents 118, 120 for respective engagement with complementary slots 122, 124 in the rearward major surface element 106.

As is now readily apparent, the objective lens element 96 may be inserted into the frame member 102 as follows. The objective lens element 96 is first slidingly inserted between the folded flange portions 70 and 72 that the projections 88 and 90 become engaged respectively with complementary slots 74 and 76. The parallelepiped structure 102 is then opened by pivoting the major surface elements 104, 106 about the flexible edges of the side wall member 112 so as to spread apart the opposed major surface elements 104, 106 to accommodate its sliding engagement with the objective lens element 96 and the folded flange portions 74, 76. Once slidingly engaged in this manner, the opposed major surface elements 104 and 106 may be pivoted toward each other about the flexible edges of side wall member 112 so as to bring the major surface element 104 into engagement with the forward face of the objective lens 96 while simultaneously bringing the rearward major surface element 106 into engagement with the rearward edges of the folded flange portions 70 and 72. In this manner, the top and bottom flange portions 114 and 116 are also slidingly engaged with respective slots 122 and 124 so as to be snap-fitted into place upon passage of the detents 118, 120 through respective slots 122, 124. Pivoting of the opposed major surface elements 104 and 106 in the aforementioned manner also operates to pivot another side wall 123 into sliding engagement with the outside surface of the side wall section 69 so as to inhibit sideways withdrawal of the parallelepiped section 102 from the frame member 68. As is now readily apparent, the objective lens element 96 is fixedly secured to the frame member 69 by the co-action of the opposed major surface elements 104, 106 which respectively engage the forward face of the objective lens 96 and the trailing edges of the folded flange portions 70 and 72.

Means are also provided for masking the eye lens 98 in substantial coincidence to the rectangular field of view. The means for masking the eye lens include a second parallelepiped structure 128 comprising a forward major surface element 130 spaced apart in generally parallel relation to a rearward major surface element 132 by way of a sidewall member 134. The opposed major surface elements 130, 132 include respectively rectangular apertures 136, 138 therethrough in substantial registration with respect to the rectangular field of view thereby presenting additional light baffles to stray light which might otherwise enter the combined view and rangefinder 12. The forward major surface element 130 includes a folded flange portion 140 at the top therof which flange portion is recessed at 144 for complementary engagement with the eye lens projection 88. In like manner, the bottom of the major surface element 130 is folded to provide a bottom flange portion 142 having a recess 146 which is configured for complementary engagement with the eye lens projection 90. There is additionally included another side wall member 148 extending rearwardly from the forward major surface element 130 and having a slot 150 therein for snap-fitting engagement with a complementary flange type detent 162 folded rearwardly from the rearward major surface element 132. There are additionally provided spaced apart flange portions 172 folded forwardly from the rearward major surface element 132. Again, as was previously discussed with regard to the parallelepiped structure 102, the parallelepiped structure 128 may consist of a thin folded sheet metal stamping.

The eye lens may be fixedly stationed with respect to the frame member 69 in the following manner. The forward and rearward major surface elements 130, 132 may be pivoted outward with respect to each other about the flexible edges of the side wall member 134 in the same manner as previously discussed with regard to the parallelepiped structure 102. The eye lens 98 may thereafter be inserted between the top and bottom flange portions 140 and 142 with the projections 88 and 90 slidingly engaging respective complementary recesses 144 and 146. The combined eye lens 96 and parallelepiped structure 128 may thereafter be slided sideways between the folded flange portions 78 and 80 in a manner whereby the projections 88 and 90 slidingly engage respective slots 82 and 84. The eye lens 98 and its associated parallelepiped structure 128 are fully inserted when the projection 92 abuttingly engages the interior surface of the side wall section 69. The rearward major surface element 132 may then be pivoted about the edges of the side wall member 134 so as to bring the opposed flange portions 172 into sliding engagement with respective edge portions 174 of respective flange portions 78, 80. The flange type detent 162 may thereafter be snap-fitted within the slot 150 so as to maintain the forward and rearward major surface elements 130 and 132 in substantially parallel spaced apart fixed relation with respect to each other. Thus, engagement between the flange portions 172 and respective edges 174 of the frame member 68 operate to inhibit sliding withdrawal of the eye lens 98 from the frame member 69.

The dichroic beam splitter 100 is supported within the frame member 68 by means of a retaining plate shown generally at 175 which operates to support the beam splitter 100 by way of slots and flanges in the frame member 68 which cooperates with complementary configured flanges in the retainer plate 175. The beam splitter retaining plate 175 includes a folded horizontal section 176 having an aperture 178 therethrough for performing a light baffling function in the manner previously discussed. The dichroic beam splitter 100 is preferably a diamond shaped parallelogram extending obliquely outward from the side wall member 69 for reasons which will become apparent from the following discussion. As a result of the oblique orientation of the dichroic beam splitter 100 with respect to the side wall 69, the diamond shape facilitates the parallel alignment of the top and bottom edges of the dichroic beam splitter 100 with respective folded flange portions 78 and 72. In addition, the diamond shape facilitates a parallel alignment of the side edge of the dichroic beam splitter 100 with the side wall 69. Although the dichroic beam splitter 100 is obliquely angled with respect to the side wall 69, it nevertheless is positioned in a plane which intersects the optical axis of the objective lens 96 at a nominal angle of 45°. The dichroic beam splitter 100 is supported at three points by way of the retainer plate 175 together with an adjustment screw 180 for finally adjusting the exact plane of the dichoric beam splitter 100.

The frame member 68 additionally includes another side wall member 182 extending obliquely downward from the side wall 69 for supporting a unitary member 183 comprising a third movable lens element 184 for limited displacement about a determinate path together with a specularly reflective surface or mirror 186 in spaced apart optical alignment with respect to the movable lens element. The specularly reflective surface 186 may comprise a mirror mounted on a bent over tab section 188 which extends laterally outward from the oblique side wall 186 of the frame member 68. A pair of spaced apart raised bosses 190 are integrally formed on the tab portion 188 and in combination with an adjustment screw 192 define a three point mounting plane on which the mirror 186 rests. The adjustment screw 192 may be used to slightly change the plane in which the mirror 186 is positioned. The mirror 186 is retained in place by a second retainer plate 194 which includes a tab section 196 for insertion into a complementary slot 198 in the oblique side wall 182. On the opposite side of the retainer plane 194 from the tab 196, there is provided a flexible finger 200 having a detent 202 at the outside edge thereof which is provided to snap-fit about the bottom surface of the tab section 188. Thus, the mirror is first placed in overlying relation with respect to the pair of raised bosses 190 and the adjusting screw 192 and the retainer plate 194 thereafter placed in overlying relation with respect to the mirror 186 with the tab 196 slidingly engaged to the complementary receiving slot 198. The retainer plate 194 is thereafter pressed firmly down on the surface of the mirror 186 so as to cause the detent 202 to snap over the underlying surface of the bent tab portion 188. The retainer plate 194 additionally includes an aperture 206 therethrough which defines that part of the surface of the mirror that provides a useful specially reflective surface.

The unitary member 183 and its movable lens element 184 is preferably of an injection molded plastic construction having an effective focal length identical to that of the objective lens 96. Extending outward from the side of the lens element 184 in a plane perpendicular to the optical axis of the movable lens element 184 there is provided an integrally molded flange portion 208 which is slidingly engaged to an elongated slot 210 in the oblique side wall 186. The elongated slot 210 operates to support the unitary member 183 and its movable lens element 184 for limited reciprocal translation along a path transverse to the scene light reflected by the mirror 186 toward the dichroic beam splitter 100. Between the lens element 184 and integrally molded flange 208 there is provided a second integrally molded vertical wall portion 212 extending laterally outward in a plane generally parallel to the optical axis of the movable lens element for slidingly engaging three spaced apart raised bosses 214 located on the oblique side wall 182. Thus, the three raised bosses 214 define a plane over which the vertical wall portion 212 of the unitary member 183 slidingly engages. A torsion spring 209 resiliently biases an integrally molded hooked flange portion 211 spaced apart in coplanar relation to the flange portion 208 of unitary member 183 so as to continuously urge the unitary member 183 against the plane defined by the three mounting bosses 214 while simultaneously biasing the overlying surface of the flange 208 firmly against a longitudinal edge of the elongated slot 210 so as to facilitate a smooth and uniform translation of the lens 184 without risk of the flange 208 wobbling within the slot 210.

The third aperture 34 admits scene light to the mirror 186 whereupon the admitted scene light is reflected by the mirror 186 to the movable lens element 184. The scene light is thereafter imaged by the movable lens element 184 and transmitted toward the dichroic beam splitter 100 so as to be deflected by the dichroic beam splitter 100 toward the eye lens 98 to accommodate viewing of a second image superposed on a first image from the objective lens element 96. The third aperture 34 and the front wall portion 24 provides a means for masking the movable lens element 184 so as to frame the second image of the scene to be photographed in a field of view perferably circular and substantially smaller than the rectangular field of view as framed for the objective lens element 96. As is now readily apparent, the plane of the scene light angularly deflected by the mirror 186 is generally parallel to the plane of the oblique side wall 182 so as to obliquely intersect the rectangular field of view of the objective lens element 96.

Figure 6:
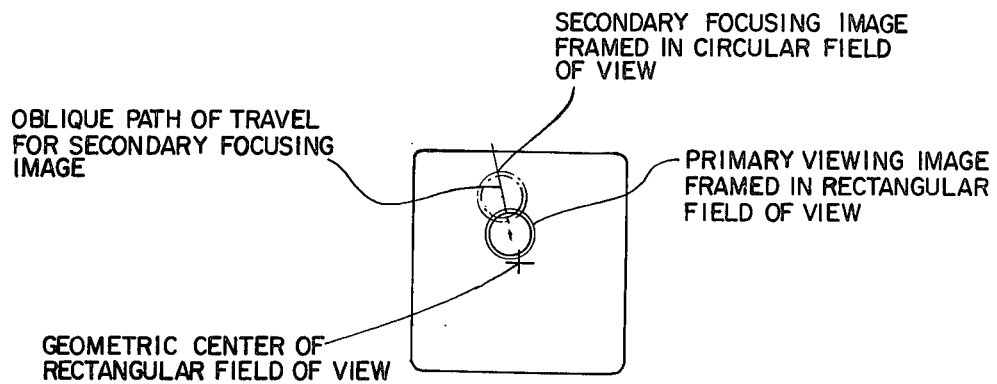
FIG. 6 is a diagrammatic view of the primary and secondary images for the combined range and viewfinder of FIG. 2.
Figure 5:
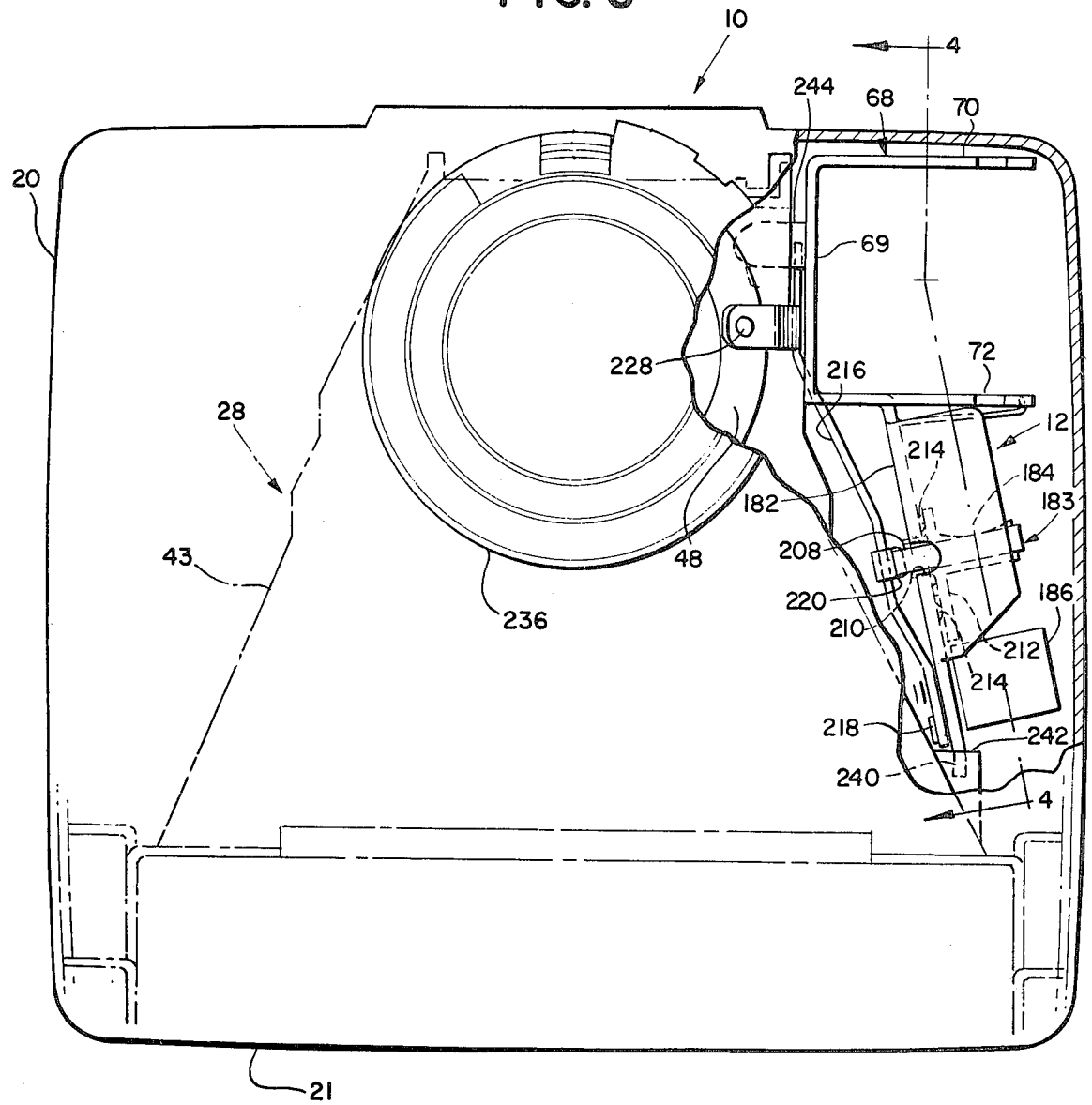
FIG. 5 is a front view with portions cut away of the camera of FIG. 1.

The combined view and rangefinder 12 operates on a principal of optical triangulation where the subject of a scene to be photographed located at some distance whose range is to be determined is viewed simultaneously through two separate apertures 32 and 34. Thus, two images of the scene to be photographed as provided respectively by the lens elements 96 and 184 are superposed in relation to each other by the dichroic beam splitter 100. Movement of the lens element 184 along its select path of reciprocal translation as determined by the elongated slot 210 will operate to move its image obliquely across the rectangular field of view of the lens element 96 as may be best seen in FIG. 6. A focused condition is achieved by moving the lens element 184 along its reciprocal path of translation until its image directly coincides with that image of the scene to be photographed as provided by the lens element 96. Referring now to FIG. 6, the third masking aperture 34 in the front wall portion 24 is circular so as to define a circular image that may be moved olbiquely across the larger rectangular image as defined by the objective lens element 96. As is now readily apparent, the oblique path of travel of one image superposed on a second image for focusing provides a means by which scenes having predominately vertical lines such as a city scene may be more easily photographed.

Means must also be provided for moving the lens element 184 across its determinate path of reciprocal translation as defined by the elongated slot 210 in correspondence to camera focusing so that the image of the lens element 184 is moved into substantial coincidence with the image of the objective lens element 96 in correspondence to the objective lens 16 of the camera 10 assuming a focused condition with respect to the scene to be photographed. Such means comprise a lever or pivot arm 216 connected for pivotal movement with respect to the frame member 68 about the pivot point 218 in the oblique side wall 186. The lever arm 216 includes a bent over tab portion 220 for sliding engagement with the flange 208 of lens 184. The lever arm 216 is resiliently biased for counterclockwise rotation about the pivot point 218 by means of a tension spring 222, one end of which connects to the lever arm 216 at a slot 225 and the other end of which connects to the oblique side wall 182 by way of a folded tab 224.

The lever arm 216 includes a forwardly projecting, generally horizontal, portion 226, the forward end of which includes an adjustable screw 228 which operates as a cam follower in a manner to be herein described. The rearward end of the horizontal portion 226 includes a double folded tab portion 230 which slidingly engages an elongated slot 232 in the side wall 69 of frame member 68. The double folded tab portion 230 and elongated slot 232 are cooperatively interengaged to limit the pivotal movement of the lever arm 216 about a limited determinate arcuate path. The spring element 209 which is connected at one end to the lever arm 216 also operates to bias the unitary member 183 and its associated lens element 184 for rearward translational motion so as to maintain the flange 208 in continuous engagement against the folded tab 220 from the lever arm 216. In this manner, clockwise rotation of the lever arm 216 about the pivot point 218 as viewed in FIG. 2 operates to impart a forward translation to the unitary member 183 and its associated lens element 184 while conversely counterclockwise rotation of the lever arm 216 about the pivot point 218 results in rearward translation of the unitary member 183 and its associated lens element 184 away from the front wall portion 24.

The objective lens 16 is disposed for movement along its optical axis in correspondence to rotation of a bezel 234. The bezel 234 may be covered by an annular adjusting knob 236. Extending rearwardly from the bezel 234, there are provided a pair of spaced apart fingers 238 which are adpated to receive a tab 50 extending forwardly from the annular ring 46. Thus, the tab 50 is engaged between the fingers 238 so as to rotate the annular ring 46 and its associated face cam 48 in correspondence with bezel 234 rotation. Rotation of the annular adjusting knob 236 and its associated bezel 234 operate to vary the focus of the objective lens 16 while simultaneously rotating the face cam 48. As is now readily apparent, stationing the cam follower screw 228 in sliding engagement with the face cam 48 operates to pivot the lever arm 216 about the pivot point 218 in correspondence with camera focusing. Such rotation of the lever arm 216 in turn is imparted by way of the bent over tab portion 220 to the unitary member 183 and its associated lens element 184 so as to cause the lens element 184 to translate along the elongated slot 210. In this manner the lens element 184 may be moved along the slot 210 in correspondence to camera focusing so that the image of the lens element 184 is moved into substantial coincidence with the image of the lens element 96 in correspondence to the objective lens 16 of the camera 10 assuming a focused condition with respect to the scene to be photographed.

Thus, it can now be readily appreciated that the combined view and rangefinder 12 provides for ease of manufacture and assembly through the use of snap-fit components. In addition, after all of the various components have been snap-fitted together to form the combined view and rangefinder 12, it is readily apparent that the combined view and rangefinder 12 may be calibrated apart from the actual camera by using a fixture that approximates the nominal dimensions of the camera 10. After calibration, the combined view and rangefinder 12 may be snap-fitted to the inner camera assembly 28 in the following manner. The oblique side wall 182 defines a right angle tab portion 240 which may be slidingly engaged to a slotted lip 242 in the side of the cone 43. In addition, the side wall 69 of the frame member 68 is provided with a laterally extending projection 244 having a dimple on the side thereof for sliding engagement with a complementary receiving slot (not shown) in the side of the exposure control module 44. In this manner, means are provided for facilitating the releasable snap-fit connection of the combined view and rangefinder 12 with respect to the inner camera assembly 28.

When the combined view and rangefinder 12 is attached to the inner camera assembly 28 in the aforementioned manner it can be seen that the distance from the pivot point 218 to the point of contact between the cam follower screw 228 and the face cam 48 is approximately three times the distance from the pivot point 218 to the point of contact between the bent over tab portion 220 and the lens flange 208. Thus, by virtue of the aforementioned three to one ratio, the rise in the face cam surface 48 through the range of focus is required to be three times greater than the length of the slot 210 through which the lens 184 moves in order to bring the two images of the combined view and rangefinder 12 into substantial coincidence over the focusing range of the camera 10. Thus, the chance of potential tolerancing errors on the face cam 48 or the lever arm 216 are minimized as a result of the aforementioned arrangement.

The surface of the dichroic beam splitter 100 and the surface of the mirror 186 are arranged in specific, slightly off set, non-parallel relation with respect to each other such that a beam of light coincident to the center line C (see FIG. 4) through the third aperture 34 is reflected by the mirror 186 through the center of the movable lens element 184 when the movable lens element 184 is located at the center of its path of reciprocal translation. Thus, the movable lens element 184 may be configured to be rotatationally symmetric about a center optical axis thereby facilitating its ease of manufacture through conventional injection molding techniques. The aforementioned specific non-parallel relationship between the mirror 186 and the dichroic beam splitter 100 thus operates to locate the path of movement for the second image of the moving lens element 184 above the geometric center of the rectangular field of view of the combined view and rangefinder 12. Locating the oblique path of movement, as shown by the phantom line of FIG. 6, for the second image of the moving lens 184 above the geometric center of the rectangular field of view is generally preferable since most photographers tend to center the subject to be photographed about the secondary image of the moving lens element 184. In the case where the photographic subject may be a person, it is generally desirable that the subject's face be located above the geometric center of the rectangular field of view as opposed to the exact geometric center.

Thus, the combined view and rangefinder as herein described provides a means for establishing a primary image of the scene to be photographed framed in a generally rectangular field of view together with a secondary focusing image superposed on the primary image and movable obliquely across the primary image in correspondence with camera focusing so that substantial coincidence between the primary and secondary images is indicative of the camera assuming a focused condition with respect to the scene to be photographed. In this manner scenes having predominately vertical lines may be more easily focused. In addition, the path of movement for the movable secondary image of the combined view and rangefinder 12 is located above the geometric center of the primary image so as to facilitate the framing of a human photographic subject wherein it is generally desirable to locate the subject's head above the geometric center of the picture. In addition, the combined view and rangefinder 12 may be conveniently assembled through snap-fitted components so as to accommodate its ease in economy and manufacture.

Since certain changes may be made in the above described embodiment without departing from the scope of the invention herein involved, it is intended that all matter contained in the above description or shown in the accompanying drawings be interpreted as illustrative and not in a limiting sense.

What is claimed is:

1. A combined view and rangefinder for use in cameras having a variable focus objective lens comprising:
   a first lens element for receiving scene light from a scene to be photographed;
   an eye lens;
   means for masking said first lens element so as to frame a first image of the scene to be photographed in a generally rectangular field of view generally corresponding to the field of view for the objective lens of the camera;
   a specularly reflective surface for receiving scene light independent of said first lens element;
   a second lens element for receiving scene light from the scene to be photographed by way of said specularly reflective surface;
   means for masking said second lens so as to frame a second image of a portion of the scene to be photographed in said field of view;
   means for splitting a light beam;
   support means for stationing said first lens element, said light beam splitting means, and said eye lens in spaced apart alignment so that said first lens element receives and transmits scene light from the scene to be photographed toward said beam splitting means which in turn transmits such scene light toward said eye lens to facilitate viewing of said first image, said support means additionally including means for supporting said second lens element for limited displacement about a determinate path and for supporting said specularly reflective surface in spaced apart optical alignment with respect to said second lens element on the opposite side of said second lens element from said beam splitting means, said specularly reflective surface operating to angularly deflect scene light to said second lens element whereby scene light received and transmitted by said second lens element is ultimately directed toward said beam splitting means so as to be deflected by said beam splitting means toward said eye lens to accommodate viewing through said eye lens of said second image superposed on said first image, said scene light angularly deflected by said specularly reflective surface residing on a plane which obliquely intersects said rectangular field of view such that movement of said second lens element about said determinate path operates to move said second image obliquely across said rectangular field of view; and
   means for facilitating movement of said second lens element across said determinate path in correspondence to camera focusing so that said second image is moved into substantial coincidence with said first image in correspondence to the objective lens of the camera assuming a focused condition with respect to the scene to be photographed.

2. The combined view and rangefinder of claim 1 wherein said first lens element, said beam splitting means and said eye lens are aligned in linear relation with respect to each other along said optical axis and wherein said specularly reflective surface, said beam splitting means and said second lens element are aligned along the optical axis of said second lens element.

3. The combined view and rangefinder of claim 1 wherein:
   said support means includes a frame member having at least a first and second plurality of spaced apart slots therein; said first lens element is molded plastic with a first plurality of projections disposed about the periphery thereof, said first plurality of projections being slidingly engaged to respective slots of said first plurality of slots; and said eye lens is molded plastic with a second plurality of projections disposed about the periphery thereof, said second plurality of projections being slidingly engaged to respective slots of said second plurality of slots.

4. The combined view and rangefinder of claim 3 wherein said first lens masking means includes a parallelepiped structure defining spaced apart, opposed major surfaces having respective rectangular apertures therethrough for framing said rectangular field of view and presenting a light baffle to stray light, said opposed major surfaces engaging respectively said first lens element and select portions of said frame member to inhibit said first lens element projections from slidingly disengaging from said respective slots of said first plurality of slots, said first lens masking means additionally including means for snap fitting said opposed major surfaces into opposed spaced apart relation with respect to each other.

5. The combined view and rangefinder of claim 3 including means for masking said eye lens in substantial coincidence to said rectangular field of view, said eye lens masking means including a parallelepiped structure defining spaced apart opposed major surfaces having respective rectangular apertures therethrough in substantial registration with respect to said field of view for presenting a light baffle to stray light, said eye lens masking means additionally including means for engaging said eye lens and select portions of said frame member to inhibit said eye lens projections from slidingly disengaging from said respective slots of said second plurality of slots, said eye lens masking means additionally including means for snap-fitting said opposed major surfaces into opposed spaced apart relation with respect to each other.

6. The combined view and rangefinder of claim 1 wherein: said support means includes an elongated frame member having a side wall section together with a first forward pair of spaced apart opposed flange portions extending laterally outward from said side wall section and a second rearward pair of spaced apart opposed flange portions extending laterally outward from said side wall section, said first pair of flange portions including respectively at least an open ended slot extending therein in directions generally parallel to said side wall section and said second pair of flange portions including respectively at least an open ended slot extending therein in directions generally perpendicular to said side wall section; said first lens element is molded pastic with a first set of opposed projections disposed about the periphery thereof, said first set of projections being slidingly engaged to respective slots in said first pair of flange portions, and said eye lens is molded plastic with a second set of opposed projections disposed about the periphery thereof, said second set of projections being slidingly engaged to respective slots in said second pair of flange portions.

7. The combined view and rangefinder of claim 6 wherein said first lens masking means includes a parallelepiped structure defining spaced apart, opposed major surfaces having respective rectangular apertures therethrough for framing said rectangular field of view and presenting a light baffle to stray light, said opposed major surfaces engaging respectively said lens element and said forward pair of spaced apart flange portions of said frame member to inhibit said first lens element projections from slidingly disengaging from said respective slots in said forward pair of spaced apart flange portions, said first lens masking means additionally including means for snap-fitting said opposed major surfaces into opposed spaced apart relation with respect to each other.

8. The combined view and rangefinder of claim 6 including means for masking said eye lens in substantial coincidence to said rectangular field of view, said eye lens masking means including a parallelepiped structure defining spaced apart opposed major surfaces having respective rectangular apertures therethrough in substantial registration with respect to said field of view for presenting a light baffle to stray light, said eye lens masking means additionally includes means for engaging said eye lens and said rearward pair of spaced apart flange portions to inhibit said eye lens projections from slidingly disengaging from said respective slots in said forward pair of spaced apart flange portions, said eye lens masking means additionally including means for snap-fitting said opposed major surfaces into opposed spaced apart relation with respect to each other.

9. The combined view and rangefinder of claim 1 wherein said support means includes an elongated frame member having at least one side wall section extending longitudinally from said first lens element to said eye lens, said frame member additionally including another side wall section extending obliquely outward with respect to said one side wall member in a plane parallel to the oblique plane defined by said angularly deflected scene light.

10. The combined view and rangefinder of claim 9 wherein said means for facilitating movement of said second lens element includes: a pivotal member connected for pivotal movement with respect to said other side wall section, said pivotal member having a first portion thereof connecting to said second lens element and a second portion thereof slidingly engaged to a complementary slot in said one side wall section to limit pivotal movement of said pivotal member about a determinate arcuate path, said pivotal member additionally including a cam follower portion for movement in correspondence to objective lens focusing, and biasint means for resiliently urging said pivotal member to pivot in a select direction to maintain said cam follower in position for movement in correspondence to objective lens focusing.

11. The combined view and rangefinder of claim 1 wherein said support means includes means for facilitating its releasable snap-fit connection with respect to the camera.

12. The combined view and rangefinder of claim 1 wherein:
said support means includes at least one elongated frame member having at least one planar side wall section extending longitudinally between said first lens element and said eye lens and wherein said light beam splitting means includes at least one diamond shaped partially reflective planar surface extending obliquely outward of said side wall, said diamond shape facilitating the alignment of respective edges of said partially reflective planar surface in respective planes which are either perpendicular or parallel to said side wall section.

13. A combined view and rangefinder for use in cameras having a variable focus objective lens comprising:
a first lens element for receiving scene light from a scene to be photographed;
an eye lens;
means for masking said first lens element so as to frame a first image of the scene to be photographed in a generally rectangular field of view generally corresponding to the field of view for the objective lens of the camera, said masking means being generally symmetric about a first centerline therethrough;
a specularly reflective planar surface for receiving scene light independent of said first lens element;
a second lens element for receiving scene light from the scene to be photographed by way of said specularly reflective surface;
means for masking said second lens so as to frame a second image of a portion of the scene to be photographed in said field of view, said second lens masking means being generally symmetric about a second centerline spaced apart from said first centerline;

means for splitting a light beam including a partially reflective planar surface;

support means for stationing said first lens element, said light beam splitting means and said eye lens in spaced apart alignment so that said first lens element receives and transmits scene light from the scene to be photographed toward said beam splitting means which in turn transmits such scene light toward said eye lens to facilitate viewing of said first image, said support means additionally including means for supporting said specularly reflective surface in spaced apart relation with respect to said partially reflective planar surface so as to receive scene light from the scene to be photographed in a direction slightly offset from being parallel to said first optical axis and to angularly deflect such scene light toward said partially reflective surface, said support means also operating to support said second lens element for limited reciprocal translation along a path transverse to the scene light reflected by said specularly reflective surface toward said partially reflective surface so that scene light received from said specularly reflective surface and transmitted by said second lens element is ultimately directed toward said beam splitting means so as to be deflected by said beam splitting means toward said eye lens to accommodate viewing of said second image superposed on said first image, said partially reflective planar surface and said specularly reflective planar surface being arranged in specific non-parallel relationship with respect to each other such that a beam of light coincident to said centerline through said second lens masking means is reflected by said specularly reflective surface through the center of said second lens element when said second lens element is located at the center of its said path of reciprocal translation, said specific non-parallel relationship between said specularly reflective planar surface and said partially reflective planar surface operating to locate said second image above the geometric center of said field of view; and means for facilitating movement of said second lens element across its said path in correspondence to camera focusing so that said second image may be moved about a path above the geometric center of said field of view and thereby brought into substantial coincidence with said first image at a location above the geometric center of said field of view when the objective lens of the camera is in a focused condition with respect to the scene to be photographed.

14. The combined view and rangefinder of claim 13 wherein:

said support means includes a frame member having at least a first and second plurality of spaced apart slots therein: said first lens element is molded plastic with a first plurality of projections disposed about the periphery thereof, said first plurality of projections being slidingly engaged to respective slots of said first plurality of slots: and said eye lens is molded plastic with a second plurality of projections disposed about the periphery thereof, said second plurality of projections being slidingly engaged to respective slots of said second plurality of slots.

15. The combined view and rangefinder of claim 14 wherein said first lens masking means includes a parallelepiped structure defining spaced apart, opposed major surfaces having respective rectangular apertures therethrough for framing said rectangular field of view and presenting a light baffle to stray light, said opposed major surfaces engaging respectively said first lens element and select portions of said frame member to inhibit said first lens element projections from slidingly disengaging from said respective slots of said first plurality of slots, said first lens masking means additionally including means for snap-fitting said opposed major surfaces into opposed spaced apart relation with respect to each other.

16. The combined view and rangefinder of claim 14 including means for masking said eye lens in substantial coincidence to said rectangular field of view, said eye lens masking means including a parallelepiped structure defining spaced apart opposed major surfaces having respective rectangular apertures therethrough in substantial registration with respect to said field of view for presenting a light baffle to stray light, said eye lens masking means additionally including means for engaging said eye lens and select portions of said frame member to inhibit said eye lens projections from slidingly disengaging from said respective slots of said second plurality of slots, said eye lens masking means additionally including means for snap-fitting said opposed major surfaces into opposed spaced apart relation with respect to each other.

17. The combined view and rangefinder of claim 13 wherein: said support means includes an elongated frame member having a side wall section together with a first forward pair of spaced apart opposed flange portions extending laterally outward from said side wall section and a second rearward pair of spaced apart opposed flange portions extending laterally outward from said side wall section, said first pair of flange portions including respectively at least an open ended slot extending therein in directions generally parallel to said side wall section and said second pair of flange portions including respectively at least an open ended slot extending therein in directions generally perpendicular to said side wall section; said first lens element is molded plastic with a first set of opposed projections disposed about the periphery thereof, said first set of projections being slidingly engaged to respective slots in said first pair of flange portions, and said eye lens is molded plastic with a second set of opposed projections disposed about the periphery thereof, said second set of projections being slidingly engaged to respective slots in said second pair of flange portions.

18. The combined view and rangefinder of claim 17 wherein said first lens masking means includes a parallelepiped structure defining spaced apart, opposed major surfaces having respective rectangular apertures therethrough for framing said rectangular field of view and presenting a light baffle to stray light, said opposed major surfaces engaging respectively said lens element and said forward pair of spaced apart flange portions of said frame member inhibit said first lens element projections from slidingly disengaging from said respective slots in said forward pair of spaced apart flange portions, said first lens masking means additionally including means for snap-fitting said opposed major surfaces into opposed spaced apart relation with respect to each other.

19. The combined view and rangefinder of claim 17 including means for masking said eye lens in substantial coincidence to said rectangular field of view, said eye lens masking means including a parallelepiped structure defining spaced apart opposed major surfaces having respective rectangular apertures therethrough in substantial registration with respect to said field of view for presenting a light baffle to stray light, said eye lens masking means additionally including means for engaging said eye lens and said rearward pair of spaced apart flange portions to inhibit said eye lens projections from slidingly disengaging from said respective slots in said forward pair of spaced apart flange portions, said eye lens masking means additionally including means for snap-fitting said opposed major surfaces into opposed spaced apart relation with respect to each other.

20. The combined view and rangefinder of claim 13 wherein said support means includes an elongated frame member having at least one side wall section extending longitudinally from said first lens element to said eye lens, said frame member additionally including another side wall section extending obliquely outward with respect to said one side wall member.

21. The combined view and rangefinder of claim 20 wherein said means for facilitating movement of said second lens element include: a member connected for pivotal movement with respect to said other side wall section, said pivotal member having a first portion thereof connecting to said second lens element and a second portion thereof slidingly engaged to a complementary slot in said one side wall section to limit pivotal movement of said pivotal member about a determinate arcuate path, said pivotal member additionally including a cam follower portion for movement in correspondence to objective lens focusing, and biasing means for resiliently urging said pivotal member to pivot in a select direction to maintain said cam follower in position for movement in correspondence to objective lens focusing.

22. The combined view and rangefinder of claim 13 wherein said support means includes means for facilitating its releasable snap-fit connection with respect to the camera.

23. The combined view and rangefinder of claim 13 wherein:
said support means includes at least one elongated frame member having at least one planar side wall section extending longitudinally between said first lens element and said eye lens and wherein said light beam splitting means includes at least one diamond shaped partially reflective planar surface extending obliquely outward of said side wall, said diamond shape facilitating the alignment of respective edges of said partially reflective planar surface in respective planes which are either perpendicular or parallel to said side wall section.

24. A combined view and rangefinder for use in cameras having a variable focus objective lens comprising:
a first lens element for receiving scene light from a scene to be photographed and imaging the scene light so received in a field of view generally corresponding to the field of view for the objective lens of the camera;
a specularly reflective surface for receiving scene light independent of said first lens element;
a second lens element for receiving scene light from the scene to be photographed by way of said specularly reflective surface and for imaging the scene light independent of the scene light imaged by said first lens element;
means for splitting a light beam;
an eye lens for viewing said imaged scene light from said first and second lens elements;
support means for stationing said first lens element, said light beam splitting means and said eye lens in spaced apart alignment so that said first lens element receives and transmits scene light from the scene to be photographed toward said beam splitting means which in turn transmits such scene light toward said eye lens to facilitate viewing of imaged scene light, said support means additionally supporting said second lens element for limited displacement about a determinate path while also supporting said specularly reflective surface in spaced apart optical alignment with respect to said second lens element on the opposite side of said second lens element from said beam splitting means, said specularly reflective surface operating to angularly deflect scene light to said second lens element whereby scene light received and transmitted by said second lens element is ultimately directed toward said beam splitting means so as to be deflected by said beam splitting means toward said eye lens to accommodate viewing through said eye lens of said scene light imaged by said second lens element, said support means comprising a unitary stamped metal frame member having a first section extending longitudinally from said first lens element to said eye lens, said frame member additionally including folded portions extending outward from said first section for engagingly supporting said first lens element, said beam splitting means and said eye lens, said frame member additionally including a second section extending laterally outward from said first section, said second section including a longitudinal slot which defines said determinate path of displacement for said second lens element and additionally including at least one folded portion for supporting said specularly reflective surface; and
means for facilitating movement of said second lens element across said determinate path in correspondence to camera focusing so that said second image is moved into substantial coincidence with said first image in correspondence to the objective lens of the camera assuming a focused condition with respect to the scene to be photographed.

25. The combined view and rangefinder of claim 24 wherein:
said folded portions of said frame member include at least a first and second plurality of spaced apart slots therein: said first lens element is molded plastic with a first plurality of projections disposed about the periphery thereof, said first plurality of projections being slidingly engaged to respective slots of said first plurality of slots; and said eye lens is molded plastic with a second plurality of projections disposed about the periphery thereof, said second plurality of projections being slidingly engaged to respective slots of said second plurality of slots.

26. The combined view and rangefinder of claim 25 including means for masking said first lens element so as to frame the scene light imaged by said first lens element in a generally rectangular field of view wherein said first lens masking means includes a parallelepiped structure defining spaced apart, opposed major surfaces having respective rectangular apertures therethrough for framing said rectangular field of view and presenting a light baffle to stray light, said opposed major surfaces engaging respectively said first lens element and select portions of said frame member to inhibit said first lens element projections from slidingly disengaging from said respective slots of said first plurality of slots, said first lens masking means additionally including means for snap-fitting said opposed major surfaces into opposed spaced apart relation with respect to each other.

27. The combined view and rangefinder of claim 25 including means for masking said eye lens in substantial coincidence to said rectangular field of view, said eye lens masking means including a parallelepiped structure defining spaced apart opposed major surfaces having respective rectangular apertures therethrough in substantial registration with respect to said field of view for presenting a light baffle to stray light, said eye lens masking means additionally including means for engaging said eye lens and select portions of said frame member to inhibit said eye lens projections from slidingly disengaging from said respective slots of said second plurality of slots, said eye lens masking means additionally including means for snap-fitting said opposed major surfaces into opposed spaced apart relation with respect to each other.

28. The combined view and rangefinder of claim 24 wherein: said folded portions include a first forward pair of spaced apart opposed flange portions extending laterally outward from said first section and a second rearward pair of spaced apart opposed flange portions extending laterally outward from said first section, said first pair of flange portions including respectively at least an open ended slot extending therein in directions generally parallel to said first section and said second pair of flange portions including respectively at least an open ended slot extending therein in directions generally perpendicular to said first wall section; said first lens element is molded plastic with a first set of opposed projections disposed about the periphery thereof, said first set of projections being slidingly engaged to respective slots in said first pair of flange portions, and said eye lens is molded plastic with a second set of opposed projections disposed about the periphery thereof, said second set of projections being slidingly engaged to respective slots in said second pair of flange portions.

29. The combined view and rangefinder of claim 28 including means for masking said first lens element so as to frame the scene light imaged by said first lens element in a generally rectangular field of view wherein said first lens masking means includes a parallelepiped structure defining spaced apart, opposed major surfaces having respective rectangular apertures therethrough for framing said rectangular field of view and presenting a light baffle to stray light, said opposed major surfaces engaging respectively said lens element and said forward pair of spaced apart flange portions of said frame member to inhibit said first lens element projections from slidingly disengaging from said respective slots in said forward pair of spaced apart flange portions, said first lens masking means additionally including means for snap-fitting said opposed major surfaces into opposed spaced apart relation with respect to each other.

30. The combined view and rangefinder of claim 28 including means for masking said eye lens in substantial coincidence to said rectangular field of view, said eye lens masking means including a parallelepiped structure defining spaced apart opposed major surfaces having respective rectangular apertures therethrough in substantial registration with respect to said field of view for presenting a light baffle to stray light, said eye lens masking means additionally including means for engaging said eye lens and said rearward pair of spaced apart flange portions to inhibit said eye lens projections from slidingly disengaging from said respective slots in said forward pair of spaced apart flange portions; said eye lens masking means additionally including means for snap-fitting said opposed major surfaces into opposed spaced apart relation with respect to each other.

31. The combined view and rangefinder of claim 24 wherein said second section extends obliquely outward with respect to said first section.

32. The combined view and rangefinder of claim 24 wherein said means for facilitating movement of said second lens element include: a member connected for pivotal movement with respect to said second section, said pivotal member having a first portion thereof connecting to said second lens element and a second portion thereof slidingly engaged to a complementary slot in said first section to limit pivotal movement of said pivotal member about a determinate arcuate path, said pivotal member additionally including a cam follower portion for movement in correspondence to objective lens focusing, and biasing means for resiliently urging said pivotal member to pivot in a select direction to maintain said cam follower in position for movement in correspondence to objective lens focusing.

33. The combined view and rangefinder of claim 24 wherein said support means includes means for facilitating its releasable snap-fit connection with respect to the camera.

34. The combined view and rangefinder of claim 24 wherein:
said first section comprises a generally planar side wall and said light beam splitting means includes at least one diamond shaped partially reflective planar surface extending obliquely outward of said side wall, said diamond shape facilitating the alignment of respective edges of said partially reflective planar surface in respective planes which are either perpendicular or parallel to said side wall section.

35. A camera of the rangefinder type comprising:
a variable focus objective lens;
a camera housing having portions structured to be normally held in a horizontal plane during a photographic exposure cycle, said camera housing including a front wall portion having a first aperture for accommodating the admission of scene light to said objective lens, a second aperture spaced apart from said first aperture and a third aperture spaced apart from said second aperture along a line which intersects said second aperture and is oblique to the horizontal plane when said camera is held in its said normal position; and
a combined viewing and rangefinding means for imaging scene light received through said second aperture to provide a first image in a field of view generally corresponding to the field of view for said objective lens, and for imaging scene light received through said third aperture to provide a second image in a portion of said field of view, said imaged scene light received through said third aperture being superposed on said imaged scene light received through said second aperture so that said first and second images may be viewable together from a position outside of said camera housing, said combined view and rangefinding means additionally including means for facilitating movement of said second image across said first image along said oblique line when said camera is held in its said normal position, said second image moving in correspondence to camera focusing so that said second image is moved into substantial coincidence with said first image in correspondence to said objective lens assuming a focused condition with respect to the scene to be photographed.

36. The camera of claim 35 wherein said front wall portion includes an apron extending laterally forward of and downward from said objective lens to a forward edge parallel to the horizontal plane when said camera is held in its said normal position, said apron including a recessed portion forward of said third aperture to accommodate the admission of scene light to said third aperture.

37. The camera of claim 36 wherein said camera includes a motor and switch control apparatus stationed immediately adjacent the underside of said apron and beside said recessed portion.

* * * * *